United States Patent [19]

Burgdorf et al.

[11] Patent Number: 4,682,824
[45] Date of Patent: Jul. 28, 1987

[54] BRAKING PRESSURE GENERATOR FOR SLIP-CONTROLLED BRAKE SYSTEMS OF AUTOMOTIVE VEHICLES

[75] Inventors: Jochen Burgdorf, Offenbach-Rupenheim; Lutz Weise, Mainz, both of Fed. Rep. of Germany

[73] Assignee: Alfred Teves GmbH, Frankfurt am Main, Fed. Rep. of Germany

[21] Appl. No.: 757,520

[22] Filed: Jul. 19, 1985

[30] Foreign Application Priority Data

Jul. 25, 1984 [DE] Fed. Rep. of Germany ....... 3427380

[51] Int. Cl.$^4$ ................................................. B60T 8/02
[52] U.S. Cl. ...................................... 303/92; 303/114; 60/535; 60/560; 60/563
[58] Field of Search ................... 303/92, 52, 114, 119, 303/116, 10; 60/534, 535, 560, 563

[56] References Cited

U.S. PATENT DOCUMENTS

| | | | |
|---|---|---|---|
| 3,999,807 | 12/1976 | Haraikawa | 60/535 |
| 4,482,192 | 11/1984 | Leiber | 303/119 |
| 4,555,144 | 11/1985 | Belart et al. | 303/92 |
| 4,557,528 | 12/1985 | Leiber | 303/92 |

*Primary Examiner*—John W. Caldwell, Sr.
*Assistant Examiner*—Alvin Oberley
*Attorney, Agent, or Firm*—James B. Raden; William J. Michals

[57] ABSTRACT

A braking pressure generator for slip-controlled brake systems of automotive vehicles comprises dynamic (III) and static (I, II) pressure fluid circuits into which pressure fluid from the dynamic circuit (III) is metered during braking with slip control. A differential pressure pilot valve (4) is provided which compares the pressure in a booster chamber (15) of the hydraulic circuit (III) with the pressure in a prechamber (5) into which pressure is metered during braking with slip control. The differential pressure pilot valve (4) is connected to an alarm switch (9). The switching position of this alarm switch is logically combined with the switching position of a brake-actuating switch (8) and with the brake slip control signal (10) and an error signal is derived therefrom.

4 Claims, 3 Drawing Figures

| BLS | (8) | 0 | 1 | 1 | 0 | 1 | 1 |
|---|---|---|---|---|---|---|---|
| WS | (9) | 0 | 1 | 0 | 1 | 0 | 1 |
| AS | (26) | 0 | 0 | 1 | 0 | 0 | 1 |
| A | | 1 | 1 | 1 | 0 | 0 | 0 |

BRAKING PRESSURE GENERATOR FOR SLIP-CONTROLLED BRAKE SYSTEMS OF AUTOMOTIVE VEHICLES

BACKGROUND OF THE INVENTION

The present invention relates to a braking pressure generator for slip-controlled brake systems of automotive vehicles comprising dynamic and static pressure fluid circuits. Pressure fluid is metered into the fluid circuits during braking with slip control from the dynamic circuits by way of a prechamber which during braking without slip control is connected with a pressure compensating reservoir and from which the dynamically introduced pressure fluid is fed by way of check valves. The check valve can be designed, for example, as valves in the master cylinder collar in the static brake circuits. The braking pressure generator includes a differential pressure pilot valve including a piston which under the action of the differential pressure is axially slidable within a cylinder and which upon exceeding a differential pressure threshold actuates an alarm switch.

In a known braking pressure generator of the type to compare the pressure proportional to the pedal force introduced into the booster chamber of a hydraulic brake force booster is compared with the pressure in a static brake circuit and by means of a differential pressure pilot valve. Upon starting of the slip control pressure fluid is metered from the dynamic into the static circuit. The braking pressure generator comprises the combination of a hydraulic brake force booster with a master cylinder onto which the booster pressure acts. As long as there is a pressure balance, the piston is kept in an intermediate position. If the differential pressure passes a predetermined differential pressure threshold in either direction, this indicates an error in the braking pressure generator or the elements connected thereto, which causes the brake slip control to be partially switched off or entirely by way of a signal triggered by the differential pressure pilot valve. This is described in German patent document DE-OS No. 32 32 052 the U.S. counterpart application which issued as U.S. Pat. No. 4,555,144.

The disadvantage of this known system is that a defect of the main valve controlling the dynamic flow of pressure into the static circuit is not recognizable. To avoid this disadvantage the differential pressure pilot valve is connected to a prechamber located downstream of the main valve in the dynamic flow path instead of the booster chamber. The disadvantage in turn is that the functioning of the valve is no longer checked in every braking action, but only in slip-controlled braking actions. As a consequence, an error can remain undetected for a long period of time.

Therefore, the object of the present invention is to eliminate the disadvantages described and to insert and switch the differential pressure pilot valve hydraulically and electrically in such a way that the valve is operated constantly. That is, during braking actions with slip control as well as without slip control, and any error in the braking pressure generator or in the monitoring components is immediately recognized and signalized so as to ensure that by partial or complete cutoff of the brake slip control at least a braking with limited slip control or a braking without slip control remains possible.

SUMMARY OF THE INVENTION

This object is achieved by an improvement of a braking pressure generator of the type described wherein the differential pressure pilot valve compares the pressure proportional to the brake pedal force in a booster chamber within the dynamic circuit with the pressure in the prechamber. The pilot valve actuates an alarm switch as soon as the pressure in the booster chamber exceeds the pressure in the prechamber by a predetermined pressure differential value. According to the present invention, the pressure differential value can be predetermined by the force of a spring acting against the pressure in the booster chamber, for which purpose, for example, a spring is arranged in the differential pressure pilot valve. The spring keeps the piston in its end position until the pressure in the booster chamber has increased sufficiently to overcome the force of the spring.

In accordance with a further embodiment of the present invention, the switching position and/or the output signal of the alarm switch actuated by the differential pressure pilot valve is logically combined with the switching positions and/or signals of switches responding upon brake actuation and upon starting of the slip control, respectively. For this purpose, a logic combining circuit is provided allowing the following three signal combinations: first, simultaneous response and/or switching on of the alarm switch and the brake-actuating signal while the brake slip control is switched off, that is not put into operation; second, simultaneous response of the brake-actuating signal and the brake slip controller without the alarm switch switching over; and third, simultaneous off-position and/or non-response of the brake-actuating signal, the alarm switch, and the brake slip control signal which are recognized and evaluated as an operative condition of the brake system, and that all other switching positions and/or signal combinations will trigger an error signal.

A further embodiment of the present invention provides that the brake slip control is partially switched off simultaneously with the error signal being given by blocking the braking pressure decrease due to a brake slip control signal.

Furthermore, it is possible according to the present invention to design the braking pressure regulator in such that, depending on the respective switching position and/or signal combination indicating an error, a partial cut-out of the brake slip control, a brake alarm signal and/or a brake slip control alarm signal can be triggered. Upon switching over of the alarm switch during braking without slip control or in case of non-response of the alarm switch during braking with slip control, the brake slip control is automatically switched off in part. That is, a pressure decrease at individual or all wheels that would result from a blocking signal is prevented. Further particular signal combinations indicative that certain errors have occurred can be indicated in a known manner by appropriate logic combination of the signals.

BRIEF DESCRIPTION OF THE DRAWING

Further features, advantages, and applications of the present invention are set forth in the following description taken in conjunction with the accompanying drawing wherein.

DETAILED DESCRIPTION

Figure 1:
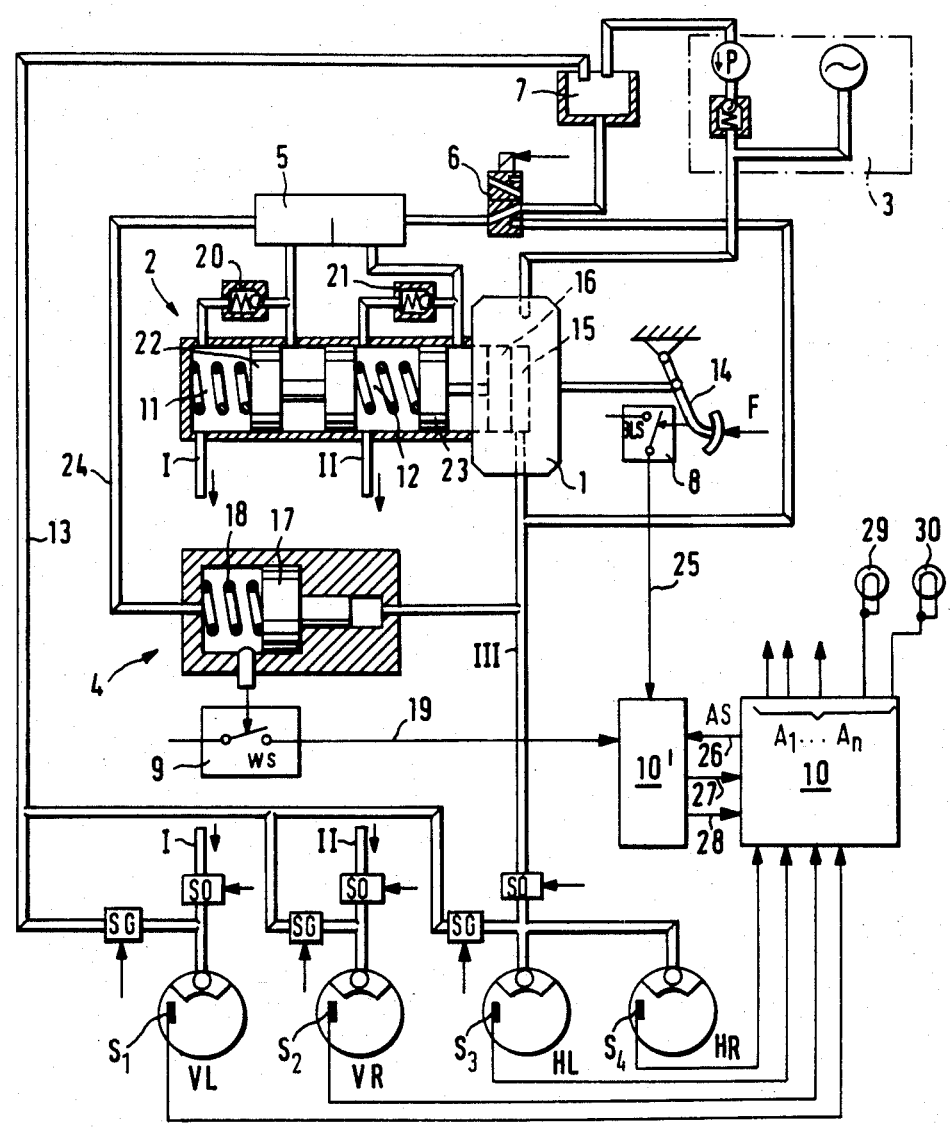
FIG. 1 is a diagrammatic view of a slip-controlled brake system with a braking pressure generator according to an embodiment of the invention.

As shown in FIG. 1, the braking pressure generator according to the present invention comprises three circuits and consists essentially of a hydraulic brake force booster 1, a tandem master cylinder 2 connected directly thereto, an auxiliary pressure source 3, and a differential pressure pilot valve 4. In addition, there are a prechamber 5, a three-way/two-position directional control valve 6 serving as main valve, a pressure compensating reservoir 7, and some electric switches 8, 9.

An electronic brake slip controller, whose function and mode of operation will be described in more detail hereinafter, is also shown symbolically and designated only by the numeral 10.

The two brake circuits I, II connected to the working chambers 11 and 12 in the tandem master cylinder 2 are connected with the wheel brake of a front wheel VL, VR each. By way of a third brake circuit III, which is designed as a dynamic brake circuit, the wheel brakes at the rear wheels HL, HR are supplied with braking pressure.

For brake slip control SO valves, that is, valves which are open in their de-energized state, are inserted in the usual manner in the pressure fluid paths. In addition, the wheel brakes are connected by way of SG valves (valves which are closed in their de-energized state) and a common return flow conduit 13 with the pressure compensating reservoir 7. All SO and SG valves can be designed as electromagnetically controllable relay valves, which is indicated by the arrow drawn in broken line symbolizing the direction of the signal when the valves respond. These signal lines are connected to the outputs $A_1$ to $A_n$ of the brake slip controller.

Information about the wheel rotational behavior which is also needed for slip control, is picked up by means of inductive sensors $S_1$ to $S_4$ and is transmitted by way of the signal lines drawn in broken lines into the electronic controller 10 or rather its combining logic.

The differential pressure pilot valve 4, which is essential to the present invention, is hydraulically switched between a booster chamber 15 inside the hydraulic booster 1, or between the booster outlet or brake circuit III and the prechamber 5.

Upon each brake actuation, i.e. upon exertion of a force in the direction of the arrow F on the pedal 14, a braking force proportional to the force F is built up which acts by way of the piston 16 upon the master cylinder 2, on the one hand, and by way of the brake circuit III upon the rear wheels, on the other. Due to this pressure, the piston 17 of the differential pressure pilot valve 4 designed as stepped piston is displaced to the left against the force of the spring 18, which causes an electric contact in the mechanically actuated alarm switch 9 to be closed. A corresponding signal is transmitted by way of a signal line 19 to a logic combining circuit 10' expediently included in the electronic system of the controller 10. For realization of the logic, either a prewired circuit or a programmable circuit, for example a microcomputer, can be used.

Displacement of the piston 17 towards the left is only possible, if and as long as the prechamber 5 is connected by way of the main valve 6 with the pressure compensating reservoir 7. This condition is fulfilled until commencement of the brake slip control.

When the brake slip controller 10 is put into operation, the main valve 6 is switched over by way of one of the outputs $A_1$ to $A_n$, thus interrupting the connection between the prechamber 5 and the pressure compensating reservoir 7 and connecting the prechamber 5 instead with the brake circuit III and/or the booster chamber 15 in the hydraulic booster 1. Thus, pressure fluid is introduced from this dynamic circuit III into the prechamber 5 and from there by way of check valves 20, 21, which can be designed e.g. as components of the collars at the circumference of the master cylinder pistons 22, 23, into the working chambers 11, 12 and thus into the static circuits I, II.

The pressure increase in the prechamber 5 is simultaneously transmitted by way of the hydraulic conduit 24 to the piston 17 of the valve 4 so that the piston returns to its initial position as illustrated and opens the contact in the alarm switch 9 or keeps it open.

Thus, the differential pressure pilot valve 4 and the alarm switch 9 actuated by the piston 17 are actuated in each braking action and reset to their initial position upon commencement of the brake slip control. By means of the electronic combining circuit 10' into which the signals of the alarm switch 9 and also by way of a signal line 25, a brake-actuating signal, which can be derived for example directly from a stop light switch 8, and finally by way of a signal line 26, the switching condition of the brake slip controller 10 can be transmitted, the switching condition of the alarm switch 9 is logically combined with the brake-actuating signal and the brake slip control signal. The signal combination enables error conditions to be recognized which are then transmitted by way of signal lines 27, 28 to the controller and result in error signalling as well as partial or complete cuttoff of the brake slip control. Two signal lamps 29 and 30 connected to the output of the controller 10 are also indicated symbolically in FIG. 1. The lamp 29 signalizes an error in the brake system, the lamp 30 an error in the brake slip control system.

Figures 2, 3:
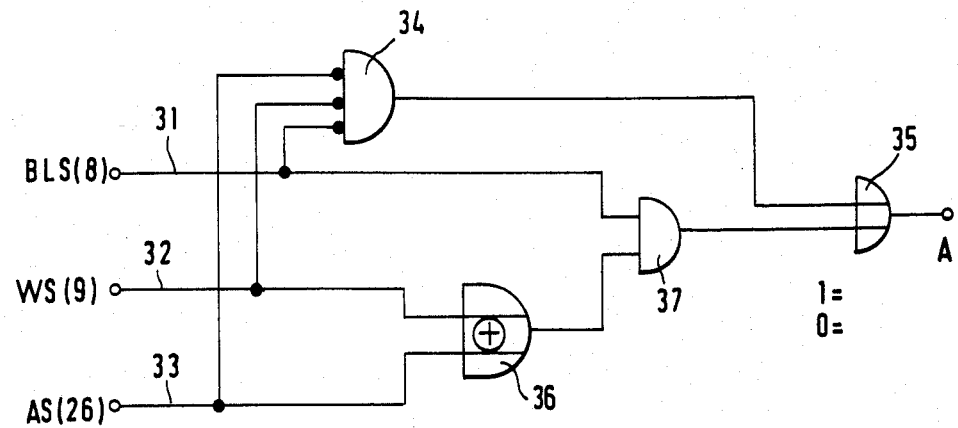
FIG. 2 is a diagram of a combining circuit.
FIG. 3 is the associated truth table corresponding to the circuit of FIG. 2.

One possibility of combining the signals of the switches 8 and 9 as well as the signal transmitted by way of line 26 about the operating condition of the brake slip control is illustrated in FIG. 2. In this example, conventional electronic gates were used for combination of the switching positions and/or output signals of the individual switches.

When the switches 8, 9 are closed and in a braking action with slip control, a signal "1" is fed to the inputs 31, 32, 33. By way of the AND gate 34, of which the inputs are alloyed, and by way of an OR gate 35 connected downstream thereof, a signal "1" is thus applied to the output A when no signal is fed to any of the inputs 31 to 33. This situation is given while the brake is in non-actuated condition. The signal "1" at the output A indicates that the brake system is in good operating condition.

If either the alarm switch 9, which signals displacement of the piston 17 in the differential pressure pilot valve 4, is closed or the brake slip control is in operation, a faultless system is signalled by way of an exclusive OR gate 36, the output signal of which is fed to an AND gate 37, if at the same time the second condition is met at the gate 37, namely the switching on of the brake-actuating signal 9. This situation exists during a braking action without slip control during which the switch 9 closes, or during a braking action with slip control which feeds the signal "1" by way of the line 26 to the logic 10' and causes a return stroke of the piston in the differential pressure pilot valve 4 and thus the opening of the alarm switch 9.

If no signal is applied to the output A, the brake system is not in order. This is why in this case, as already explained, error signals are triggered in the brake slip controller 10 by way of the lines 27, 28 and by way of the combining logic and the controller is partially or completely cut off.

FIG. 3 shows the truth table pertaining to the circuit as illustrated in FIG. 2, the signal "0" at the output A signalizing an error in the brake system.

Deviating from the electronic combining circuit as shown in FIG. 2, which distinguishes between no more than two switching conditions at its output A, namely "1 = no error" and "0 = error existing", it is also possible in accordance with the present invention to recognize and signalize different kinds of error conditions. With some switching and/or signal combinations indicating an error, signalling of an error is sufficient, whereas with other error combinations a partial or complete cutoff is appropriate. If, for example, merely the stop light switch 8 does not respond, the triggering of an alarm signal may be sufficient, whereas in case of a faulty alarm signal 9, an immediate or delayed partial cutoff of the brake slip control appears adequate. There are numerous suitable variants depending on the design of the brake system.

What is claimed is:

1. A braking pressure generator for slip-controlled brake systems of automotive vehicles comprising in combination a master cylinder and booster actuated by a brake pedal, a brake slip controller, dynamic and static pressure fluid circuits respectively connected to said booster and said master cylinder, hydraulic pressure fluid being introduced and metered during braking with slip control into said static circuits from the dynamic circuits by way of valve means controlled by said controller and a prechamber connected to said master cylinder, said prechamber during braking without slip control is hydraulically connected by way of valve means with a pressure compensating reservoir and from which the hydraulically introduced pressure fluid is fed during slip control by way of check valves operably connected to said master cylinder into the static circuits, and comprising a differential pressure pilot valve including a piston which under the action of the differential pressure is axially slidable within a cylinder and which upon exceeding a differential pressure threshold actuates an alarm switch, wherein the differential pressure pilot valve (4) during braking actions with slip control as well as without slip control compares a pressure proportional to a brake pedal force in a booster chamber (15) within the dynamic circuit with the pressure in the prechamber (5) and actuates said alarm switch (9) when the pressure in the booster chamber (15) exceeds the pressure in the prechamber (5) by said predetermined differential pressure threshold, including logic combining means wherein an on/off switching position output signal of the alarm switch (9) actuated by the differential pressure pilot valve (4) is logically combined with on/off switching position output signals of switches (8, 10) responding to brake actuation and to starting of the slip control, respectively, wherein said logic combining means comprises a logic combining circuit providing first, second and third signal combinations, wherein said first combination is indicative of simultaneous response of the switching on of the alarm switch (9) and the brake-actuating signal (switch 8) while the brake slip control signal is switched off or not put into operation, wherein said second combination is indicative of simultaneous response of the brake-actuating signal (9) and the brake slip control signal switching on without the alarm switch (9) signal switching on; and, wherein said third combination is indicative of simultaneous off-position of the brake-actuating signal (8) the alarm switch signal (9), and the brake slip control signal (10), and thereby recognized and evaluated as intact condition of the brake system, and that all other switching position signal combinations will trigger an error signal.

2. The braking pressure generator according to claim 1, wherein the brake slip controller (10) can be partially switched off simultaneously with the error signal being given by blocking a braking pressure decrease signal from said brake slip controller upon occurrence of a blocking signal.

3. The braking pressure generator according to claim 1, wherein depending on the respective switching position signal combination indicating said error signal, a partial cut-out of the brake slip controller (10), a brake alarm signal (29) and/or an alarm signal (30) of the brake slip controller is triggered.

4. The braking pressure generator according to claim 3, upon switching on of the alarm switch signal (9) during braking without slip control or in case of switching off of the alarm switch signal (9) during braking with slip control, the brake slip controller (10) is partially switched off thereby preventing a pressure decrease at all or at least one of the vehicle wheels.

* * * * *